(12) United States Patent
Kim (10) Patent No.: US 8,957,997 B2
(45) Date of Patent: Feb. 17, 2015

(54) IMAGE SENSOR AND IMAGE DATA PROCESSING METHOD USING THE SAME

(75) Inventor: Geon Pyo Kim, Guri-si (KR)

(73) Assignee: SK Hynix Inc., Gyeonggi-do (KR)

( * ) Notice: Subject to any disclaimer, the term of this patent is extended or adjusted under 35 U.S.C. 154(b) by 736 days.

(21) Appl. No.: 13/197,080

(22) Filed: Aug. 3, 2011

(65) Prior Publication Data
US 2012/0038799 A1    Feb. 16, 2012

(30) Foreign Application Priority Data
Aug. 13, 2010    (KR) .................. 10-2010-0078372

(51) Int. Cl.
H04N 9/64 (2006.01)
H04N 9/04 (2006.01)
H04N 5/367 (2011.01)

(52) U.S. Cl.
CPC ............ H04N 9/045 (2013.01); H04N 5/3675 (2013.01); H04N 9/646 (2013.01)
USPC ...................................... 348/246; 348/222.1

(58) Field of Classification Search
CPC ..... H04N 5/357; H04N 5/367; H04N 5/3675; G06T 5/005
USPC ........................................ 348/222.1, 246–247
See application file for complete search history.

(56) References Cited

U.S. PATENT DOCUMENTS

| | | | |
|---|---|---|---|
| 6,768,513 B1 * | 7/2004 | Watanabe et al. | 348/246 |
| 2004/0150731 A1 * | 8/2004 | Hara | 348/246 |
| 2010/0040303 A1 * | 2/2010 | Bosco et al. | 382/261 |

FOREIGN PATENT DOCUMENTS

| | | |
|---|---|---|
| KR | 1020060098227 A | 9/2006 |
| KR | 1020070012099 A | 1/2007 |

* cited by examiner

Primary Examiner — Nelson D. Hernández Hernández
(74) Attorney, Agent, or Firm — William Park & Associates Patent Ltd.

(57) ABSTRACT

An image sensor includes a storage unit configured to store at least a portion of image data, a homogeneous pixel determination unit configured to determine whether dead pixels exist in homogeneous pixels having the same color characteristic as a center pixel in a window of the image data, and an offset correction processing unit configured to calculate a difference value between the center pixel and homogeneous pixels determined as normal pixels by the homogeneous pixel determination unit, and correct a center pixel value by using the calculated difference value.

16 Claims, 10 Drawing Sheets

|Gr|R|Gr|R|Gr|
|---|---|---|---|---|
|B|Gb|B|Gb|B|
|Gr|R|Gr|R|Gr|
|B|Gb|B|Gb|B|
|Gr|R|Gr|R|Gr|

(a)

|R|Gr|R|Gr|R|
|---|---|---|---|---|
|Gb|B|Gb|B|Gb|
|R|Gr|R|Gr|R|
|Gb|B|Gb|B|Gb|
|R|Gr|R|Gr|R|

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

IMAGE SENSOR AND IMAGE DATA PROCESSING METHOD USING THE SAME

CROSS-REFERENCE(S) TO RELATED APPLICATIONS

The present application claims priority of Korean Patent Application No. 10-2010-0078372, filed on Aug. 13, 2010, which is incorporated herein by reference in its entirety.

BACKGROUND OF THE INVENTION

Exemplary embodiments of the present invention relate to an image sensor and an image data processing method using the same.

An image sensor refers to a semiconductor device which converts an optical signal into an electric signal. The image sensor is categorized into a charge coupled device (CCD) image sensor and a complementary metal oxide semiconductor (CMOS) image sensor. In the CCD image sensor individual MOS capacitors are disposed very close to each other and charge carriers are stored in the MOS capacitors. As for the CMOS image sensor, a pixel array including MOS transistors and photodiodes, a control circuit, and a signal processing circuit are integrated into a single chip.

The CCD image sensor has disadvantages in that a driving scheme is complicated, a large amount of power is dissipated, and a fabrication process is complicated because a large number of mask process steps are required. It is also difficult to achieve a one-chip implementation because a signal processing circuit cannot be integrated into a CCD chip. However, the CMOS image sensor reproduces an image by forming a photodiode and MOS transistors within a unit pixel and sequentially detecting signals in a switching scheme. The CMOS image sensor has advantages in that power dissipation is reduced and the number of masks is reduced in a fabrication process, as compared to a CCD process, thereby improving fabrication efficiency. In addition, a one-chip implementation can be achieved since several signal processing circuits and pixel arrays can be integrated into a single chip. Hence, the CMOS image sensor is considered as a next-generation image sensor.

In general, an image sensor includes a pixel array, which receives external incident light and converts photoelectric charges into electric signals, and micro lenses which are arranged in pixels on the pixel array. In addition, the image sensor includes a logic circuit which processes light sensed through the pixel array into electric signals and converts the electric signals into data.

Much research has recently been conducted to develop various methods for improving photosensitivity of the image sensor. One of these methods is to increase a fill factor which is defined as a ratio of an area occupied by a light sensing portion with respect to an entire image sensor. However, since the logic circuit part could not be fundamentally eliminated, such an effort has encountered a limit in a limited area.

Crosstalk is a representative noise component which degrades image reproduction quality of the image sensor. In the image sensor, crosstalk may occur in a region on which light is incident or may occur due to pixel arrangement of a pixel array.

It is ideal that 100% of light is incident on a photodiode region of the pixel. However, since several material layers, such as a multilayer interlayer dielectric layer, an overcoating layer (OCL), and a plurality of passivation layers, are present on the photodiode region, 100% of light is not incident on the photodiode region and a portion of light is incident onto an adjacent photodiode region.

In addition, it is usual that the pixel array is configured with a Bayer pattern which is most widely used. The Bayer pattern is characterized in that 50% green pixels, 25% red pixels, and 25% blue pixels are disposed. The red pixels and the green pixels are alternately disposed in a single line, and the blue pixels and the green pixels are alternately disposed in a next line. If the pixels are disposed in the above manner, the same green pixels can transfer a different amount of light for the same scene, depending on whether their adjacent pixel is the red pixel or the blue pixel. This is referred to as a Gb-Gr offset. Due to the Gb-Gr offset, a step-like noise component occurs in a finally reproduced image.

SUMMARY OF THE INVENTION

An embodiment of the present invention is directed to an image sensor which can reliably process Bayer pattern image data, and an image data processing method using the same.

In accordance with an embodiment of the present invention, an image sensor includes a storage unit configured to store at least a portion of image data, a homogeneous pixel determination unit configured to determine whether dead pixels exist in homogeneous pixels, in a window of the image data, having the same color characteristic as a center pixel in the window, and an offset correction processing unit configured to calculate a difference value between the center pixel and homogeneous pixels determined as normal pixels by the homogeneous pixel determination unit, and correct a center pixel value by using the calculated difference value.

In accordance with another embodiment of the present invention, a data processing method of an image sensor includes determining whether dead pixels exist in homogeneous pixels, in a window of image data, having the same color characteristic as a center pixel in the window, and calculating a difference value between the center pixel and homogeneous pixels determined as normal pixels, and correcting a center pixel value by using the calculated difference value.

DESCRIPTION OF SPECIFIC EMBODIMENTS

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
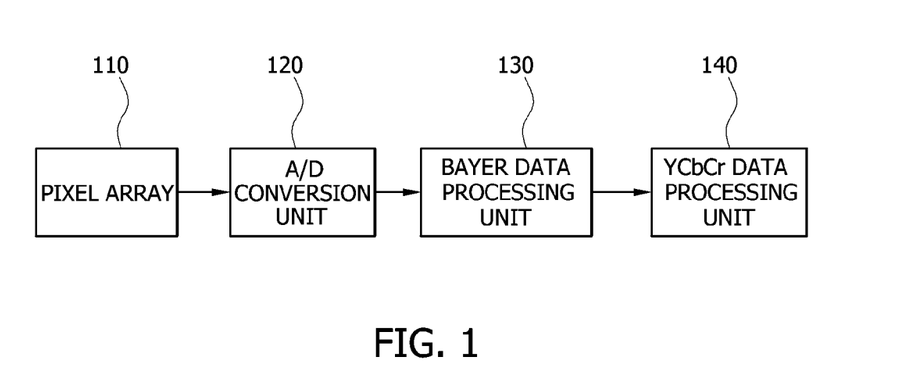
FIG. 1 is a block diagram illustrating an image sensor, which is presented for explaining the present invention.

FIG. 1 is a block diagram illustrating an image sensor, which is presented for explaining the present invention. The block diagram of FIG. 1 is illustrated based on the functions of the image sensor. The block diagram of FIG. 1 may be changed in some cases, and additional blocks may be further included therein.

Referring to FIG. 1, the image sensor includes a pixel array 110, an A/D conversion unit 120, a Bayer data processing unit 130, and a YbCbCr data processing unit 140.

The pixel array 110 includes a plurality of pixels arranged in a Bayer pattern. Specifically, pixel array 110 may comprise 50% green pixels, 25% red pixels, and 25% blue pixels. The A/D conversion unit 120 converts an analog image data value provided from the pixel array 110 into a digital value. Since the pixel array 110 provides the image data value in the Bayer pattern, the digital data provided from the A/D conversion unit 120 is also outputted in the Bayer pattern. That is, a single pixel value contains only green information, red information, or blue information. In addition, although not illustrated, a pixel read-out circuit is provided between the pixel array 110 and the A/D conversion unit 120.

In the image data processing, the Bayer data processing unit 130 expresses a period in which the Bayer pattern format is maintained. The YCbCr data processing unit 140 converts RGB data provided from the Bayer data processing unit 130 into YCbCr data. YCbCr is an imaging format used in an image system. Y is a brightness component, and Cb and Cr are chrominance components.

Although it has been described above that the image sensor illustrated in FIG. 1 uses the Bayer pattern, the invention can also be applied to a case in which the pixel array is provided with other patterns. That is, even in the case of other patterns, the invention can be applied when different values are outputted from the same color pixels, depending on pattern arrangement of the pixel array.

Figure 2:
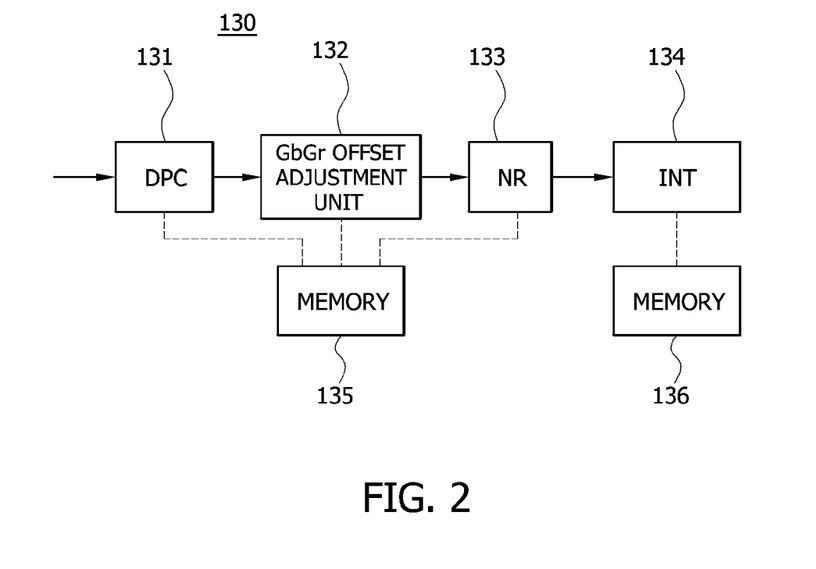
FIG. 2 is a block diagram illustrating a Bayer data processing unit of FIG. 1.

FIG. 2 is a block diagram illustrating the Bayer data processing unit of FIG. 1.

Referring to FIG. 2, the Bayer pattern processing unit 130 includes a dead pixel concealment (DPC) unit 131, a GbGr offset adjustment unit 132, a noise reduction (NR) unit 133, and an interpolation unit 134. In addition, the Bayer data processing unit 130 further includes a memory unit 135 used when the DPC unit 131, the GbGr offset adjustment unit 132, and the NR unit 133 process data, and a memory unit 136 used when the interpolation unit 134 processes data.

The DPC unit 131 checks whether a center pixel is a dead pixel or not, and if so, data for the detected dead pixel is replaced with an adjacent normal pixel data. A dead pixel is a pixel that outputs a constant value regardless of incident light on it. The center pixel will be described later. The GbGr offset adjustment unit 132 is a block which adjusts an offset occurring when a green pixel Gb whose adjacent pixel is a blue pixel and a green pixel Gr whose adjacent pixel is a red pixel in the Bayer pattern receive an equal amount of light but outputs different values. The NR unit 133 is a block which processes pixel data in order to reduce noise. The interpolation unit 134 is a block which creates RGB data which generates red, green, and blue data values corresponding to each pixel in the Bayer data containing only one of red information, green information, and blue information in each pixel. The interpolation unit 134 generates a data value of the center pixel selected using the information of the pixel adjacent to each pixel FIG. 3 is a detailed diagram illustrating a YCbCr data processing unit of FIG. 1.

Figure 3:
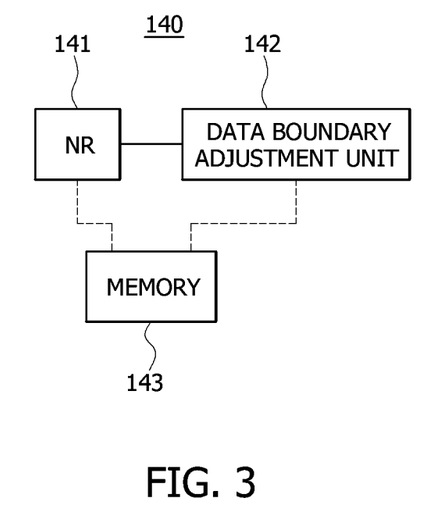
FIG. 3 is a detailed diagram illustrating an YCbCr data processing unit of FIG. 1.

Referring to FIG. 3, the YCbCr data processing unit 140 includes an NR unit 141, a data boundary adjustment unit 142, and a memory unit 143. The NR unit 141 is a block which reduces noise in a YCbCr data domain, and the data boundary adjustment unit 142 is a block which implements a clearer image by adjusting data values of both sides at the boundary of the image. For example, the NR unit 141 converts data to make a dark portion darker and a bright portion brighter. The NR unit 141 and the data boundary adjustment unit 142 may reproduce data by using a single memory unit 143 in order to reduce semiconductor chip space taken up by memory.

Figure 4:
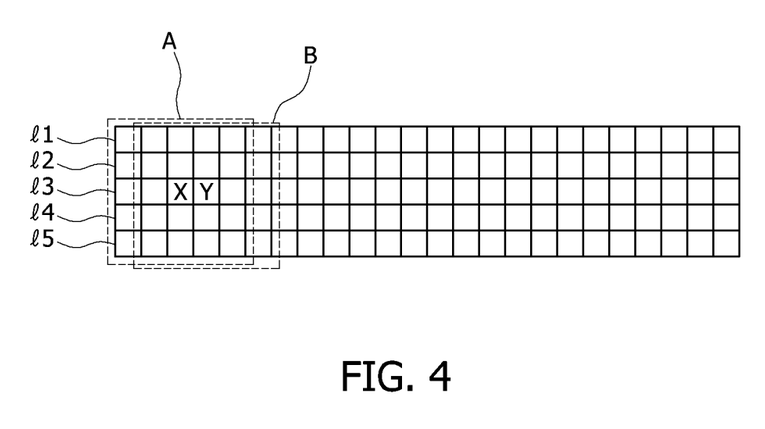
FIG. 4 illustrates a window pattern generated by a memory of FIG. 2.
Figure 5:
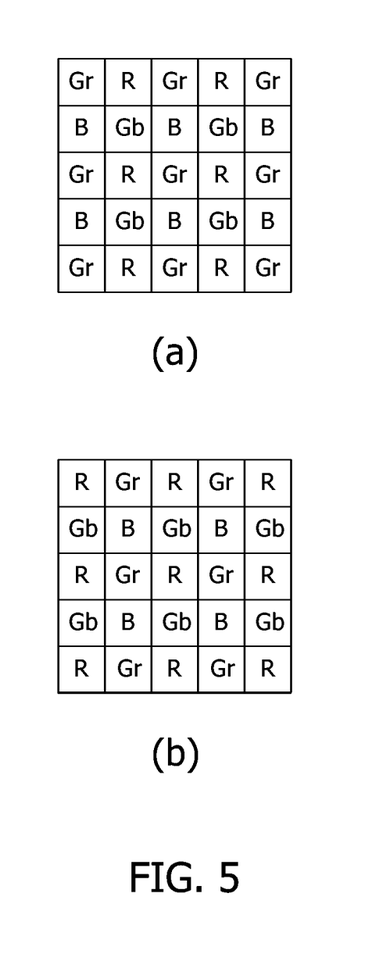
FIG. 5 illustrates the window pattern of FIG. 4 according to characteristics of pixels.

FIG. 4 illustrates a window pattern generated by the memory of FIG. 2. FIG. 5 illustrates the window pattern of FIG. 4 displayed according to characteristics of pixels. A procedure of configuring a data window will be described below with reference to FIGS. 4 and 5.

The image sensor is configured so that all information provided from the pixel array is not processed at one time, and each block receives and processes only data of a predetermined region and transfers the processed data to a next block, in order to efficiently use memory in each step.

As illustrated in FIG. 4, when it is assumed that the memory unit 135 can store data of five lines L1 to L5 in the pixel array, first 5×5 data are arranged by a data window A as illustrated in FIG. 5(a). A pixel located at the center is defined as a center pixel X, and each block performs a necessary data processing on the center pixel X. The data processing refers to an interpolation or a process of detecting an edge direction with respect to data of the center pixel X. After the data processing is performed on the center pixel X, the data window is moved to a data window "B" and data are arranged as illustrated in FIG. 5(b). At this time, a pixel located at a position "Y" becomes a center pixel. By sequentially changing the data window, all data of the pixel array are sequentially processed. Two lines located at the edges of the pixel array are used as auxiliary data.

In addition, although the case in which the data window processed by the image sensor is 5×5 has been described above, the data window may be one of various sizes, such as, for example, 3×3 or 7×7.

Figure 6:
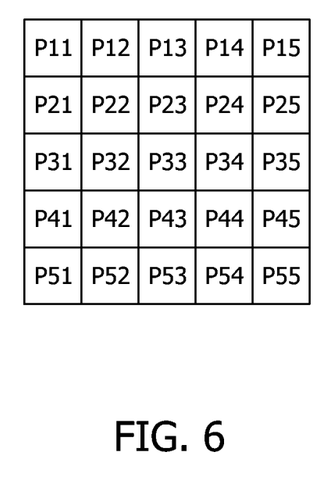
FIG. 6 illustrates the numbering of the window pattern of FIG. 4 at positions of pixels.

FIG. 6 illustrates the numbering of the window pattern of FIG. 4 at the positions of the pixels.

As described above, even when an equal amount of light is incident, output values may be different, depending on whether a center pixel P33 is Gr or Gb. Herein, it is assumed that the center pixel P33 is "Gr".

One method for eliminating the difference in the output values is mean value calculation method. First, a mean value of adjacent homogeneous Gb pixels P22, P24, P42, and P44 and a mean value of adjacent homogenous Gr pixels P11, P13, P15, P31, P33, P35, P51, P53, and P55 are calculated. A value obtained by dividing a difference of the two mean values by two is defined as a Gr-Gb offset. Additionally, a mean value of the two mean values is substituted for a value of the center pixel P33. Another method of calculating a new value for the center pixel may be to add or subtract the Gr-Gb offset value from the old value of the center pixel P33.

However, if a dead pixel exists in the pixels P11 to P44 of FIG. 6 while this method is performed, a large error can occur in the Gr-Gb offset value. A dead pixel refers to a white pixel or a dark pixel that outputs a constant value without regard to the amount of incident light. The white pixel outputs a high constant value and the dark pixel outputs a low constant value. Although the DPC unit 131 may already have performed dead pixel processing, the center pixel P33 may contain a normal pixel value or a dead pixel value from among the adjacent pixel values.

This is because the DPC unit 131, the GbGr offset adjustment unit 132, and the NR unit 133 share the single memory unit 135, and it is determined whether a pixel is a dead pixel with respect to only the center pixel. Therefore, if a dead pixel is present in the window, an error component may be added to the center pixel value rather than the Gr-Gb offset value being eliminated, even though the Gr-Gb offset value is calculated in the 5×5 window and reflected on the center pixel value.

To solve problems introduced by dead pixels, the image sensor in accordance with an embodiment of the present invention determines whether there is a dead pixel value or not, and excludes the dead pixel values when the Gr-Gb offset value is calculated.

Figure 7:
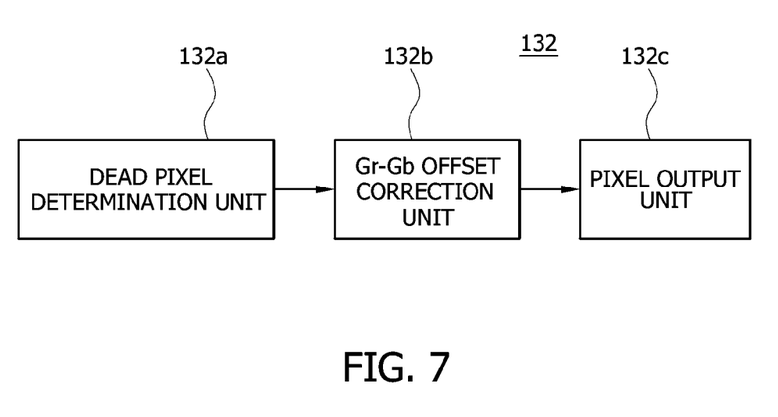
FIG. 7 is a block diagram illustrating a Gb-Gr offset adjustment unit of the image sensor in accordance with an embodiment of the present invention.

FIG. 7 is a block diagram illustrating the Gb-Gr offset adjustment unit of the image sensor in accordance with an embodiment of the present invention.

Referring to FIG. 7, the Gb-Gr offset adjustment unit 132 includes a dead pixel determination unit 132a, a Gr-Gb offset correction processing unit 132b, and a pixel output unit 132c. The dead pixel determination unit 132a determines whether a dead pixel is present in a homogeneous pixel group around the center pixel of the data window. The Gr-Rb offset correction processing unit 132b calculates an offset value by using a value of a remaining homogeneous pixel group except for the determined dead pixels, and performs an offset correction on the center pixel. The pixel output unit 132c outputs the corrected center pixel value.

Figure 8:
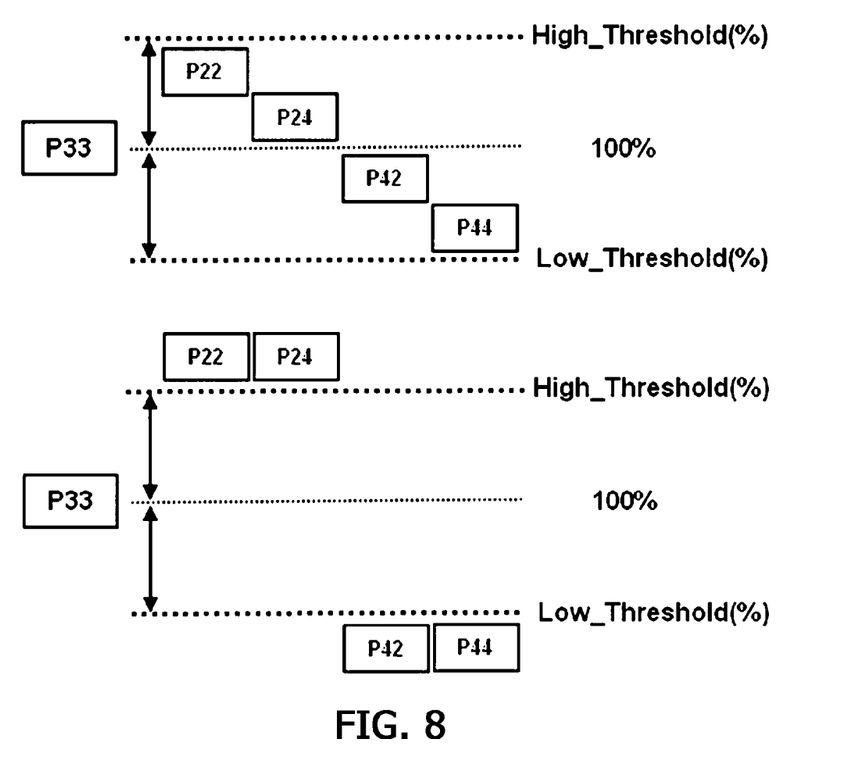
FIG. 8 illustrates a procedure of determining whether or not the homogeneous pixels around the center pixel are dead pixels in the window pattern of FIG. 5, in accordance with an embodiment of the invention.

FIG. 8 illustrates a method of determining whether the dead pixel is present in the homogeneous pixel group with respect to the center pixel in the dead pixel determination unit 132a.

When the center pixel P33 is a Gr pixel or a Gb pixel, the dead pixel determination unit 132a determines whether or not the pixels P22, P24, P42, and P44, which belong to one of the homogeneous pixel groups within the data window, are dead pixels with reference to the center pixel P33. The homogeneous pixels P22, P24, P42, and P44 are said to have priority direction and are reference pixels for the Gr-Gb offset correction. As described above, the center pixel P33 is corrected in real time in the DPC unit 131.

A threshold value is required in order for the dead pixel determination unit 132a to determine whether or not the values of the homogeneous pixel group are dead pixel values. The threshold value may be a high-threshold value or a low-threshold value. The two threshold values may be defined to be different from or equal to each other. In addition, the threshold values may be inputted from the outside or may be stored as predefined values.

As illustrated in FIG. 8, it is determined whether the value of the center pixel P33 is the high-threshold value or the low-threshold value. Values of pixels located within a range smaller than the high-threshold value and larger than the low-threshold value among the reference pixels P22, P24, P42, and P44 of the homogeneous pixel group are defined as normal pixel values and included in the Gb-Gr offset correction target. However, pixels which are out of the range are defined as dead pixels and excluded from the correction target. When there are a plurality of correction targets among the reference pixels P22, P24, P42, and P44 of the homogeneous pixel group, a pixel having the greatest difference value from the value of the center pixel P33 is selected as the Gb-Gr offset correction target.

A normal pixel range is always based on the center pixel P33, and the process of determining whether or not the pixels of the homogeneous pixel group are dead pixels is performed as follows.

I. A minimum value of the range is calculated by the multiplication operation of the center pixel P33 and the low-threshold value.

II. A maximum value of the range is calculated by the multiplication operation of the center pixel P33 and the high-threshold value.

III. A pixel belonging to a normal range is selected among the homogeneous pixel group of the center pixel.

IV. When several pixel values belong to the normal range, a pixel having the greatest pixel value is selected.

When several pixel values belong to the normal range, a maximum operation result value is found by Equation 1 expressed as SORT(|P33-P22|,|P33-P42|,|P33-P24|,|P33-P44|).

Then, the Gr-Gb offset correction processing unit 132b generates a corrected center pixel value by Equation 2 expressed as corrected center pixel=(center pixel value+ greatest pixel value among homogeneous pixels determined as normal pixels).

The pixel output unit 132c performs a clamp function in order to prevent the occurrence of over-flow, that is, to prevent the corrected center pixel value from exceeding a predefined range. When a digital value is calculated, the corrected center pixel value may be out of a calculation range due to binary number translation.

Figure 9:
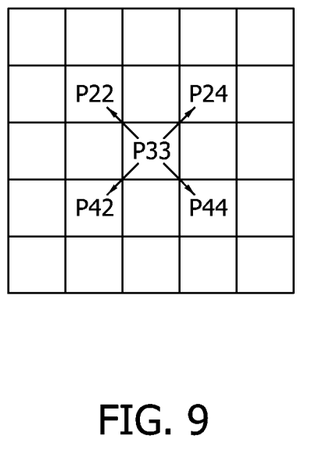
FIG. 9 illustrates priority direction of the homogeneous pixels around the center pixel in the window pattern of FIG. 5, in accordance with an embodiment of the invention.

FIG. 9 illustrates priority direction of the homogeneous pixels with respect to the center pixel in the window pattern of FIG. 5. The priority direction refers to pixels having the same color characteristic as the center pixel and having different channels from the center pixel. The channel may be classified into a Gr channel and a Gb channel, depending on whether pixels arranged on the left and right of a green pixel are red pixels or blue pixels. Therefore, when the center pixel is Gr, four adjacent Gb pixels are pixels having priority direction with respect to the center pixel Gr. As described above, the homogeneous pixels having the priority direction are reference pixels for the Gr-Gb offset correction.

As described above, the image sensor in accordance with the embodiment of the present invention performs the Gr-Gb offset correction by using only the values of the pixels which are not dead pixels, even though one or more dead pixels exist in the homogeneous pixel group with respect to the center pixel of the 5×5 window. Therefore, the Gr-Gb offset correction can be performed even though one or more dead pixels exist in the 5×5 window.

Figure 10:
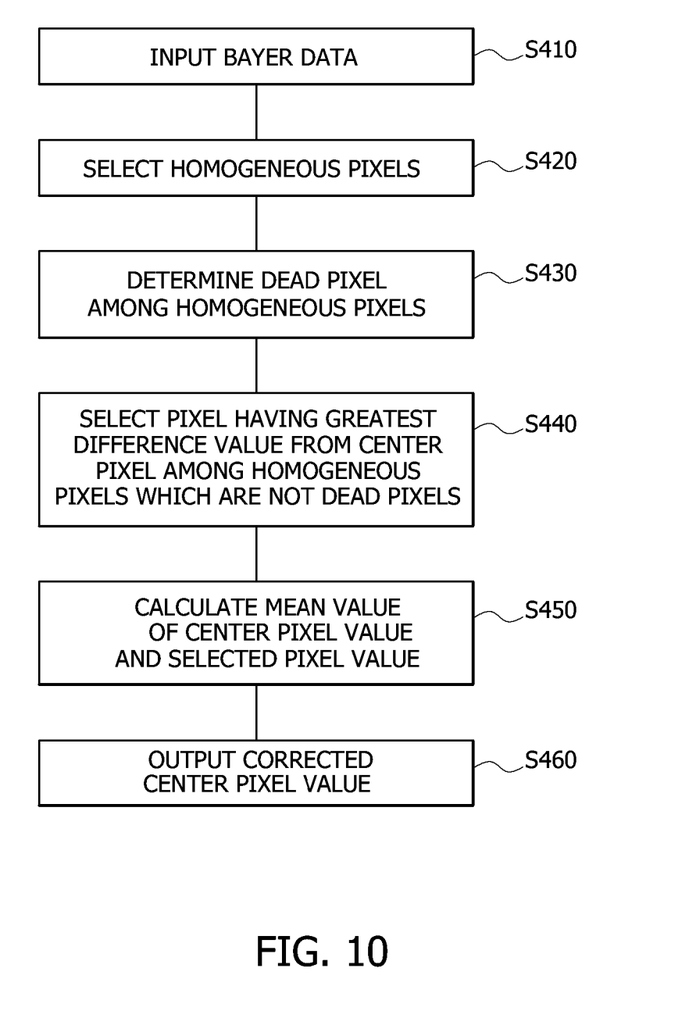
FIG. 10 is a flowchart illustrating an image signal processing method of an image sensor in accordance with an embodiment of the present invention.

FIG. 10 is a flowchart illustrating an image signal processing method of an image sensor in accordance with an embodiment of the present invention.

Referring to FIG. 9, Bayer data is inputted to the Gb-Gr offset adjustment unit 132 at step S410. At step S420, homogeneous pixels which have priority direction and are to be corrected with respect to the center pixel P333, based on the window, are selected. For example, the pixels P22, P24, P42, and P44 of FIG. 5 are selected.

At step S430, the dead pixels are determined among the homogeneous pixels by using the value of the center pixel P33, the low-threshold value, and the high-threshold value. At step S440, the homogeneous pixel having the greatest difference value from the center pixel is selected among the homogeneous pixels determined as the normal pixels. At step 450, the mean value of the center pixel value and the selected pixel value is calculated and defined as the corrected center pixel value. At step S460, the corrected center pixel value is outputted to the interpolation unit 134 (FIG. 2).

In accordance with various embodiments of the present invention, the image sensor using Bayer pattern can effectively eliminate offset between the Gr pixel and the Gb pixel. In particular, even though a plurality of dead pixels may exist in the image sensor, the image sensor can effectively eliminate offset between the Gr pixel and the Gb pixel.

While the present invention has been described with respect to the specific embodiments, it will be apparent to those skilled in the art that various changes and modifications may be made without departing from the spirit and scope of the invention as defined in the following claims.

What is claimed is:

1. An image sensor comprising: a storage unit configured to store at least a portion of image data;
   a homogeneous pixel determination unit configured to determine whether dead pixels exist in homogeneous pixels, in a window of the image data, having the same color characteristic as a center pixel in a window of the image data; and
   an offset correction processing unit configured to calculate a difference value between the center pixel and homogeneous pixels determined as normal pixels by the homogeneous pixel determination unit, and correct a center pixel value by using the calculated difference value,
   the homogeneous pixel determination unit determines the homogeneous pixels as dead pixels when pixel values of the homogeneous pixels are lower than a predetermined low-threshold value or higher than a predetermined high-threshold value, where the low-threshold value and the high-threshold value are defined based on the center pixel value,
   wherein the low-threshold value and the high-threshold value are defined by multiplying the center pixel value by a reference value.

2. The image sensor of claim 1, further comprising a dead pixel concealment (DPC) unit configured to determine whether the center pixel is a dead pixel.

3. The image sensor of claim 1, further comprising an interpolation unit configured to interpolate the corrected center pixel value.

4. The image sensor of claim 1, wherein the homogeneous pixels used to determine whether the dead pixels exist by the dead pixel determination unit have different channels with the center pixel.

5. The image sensor of claim 1, wherein the offset correction processing unit substitutes the center pixel value by a mean value of the center pixel value and the homogeneous pixel value having a greatest difference value from the center pixel among the homogeneous pixels determined as the normal pixels by the dead pixel determination unit.

6. The image sensor of claim 1, wherein the center pixel is a green pixel on the adjacent left and right sides of which blue pixels are located, or a green pixel on the adjacent left and right sides of which red pixels are located.

7. The image sensor of claim 1, wherein the image data comprises Bayer pattern.

8. The image sensor of claim 1, wherein the window comprises one of 3×3 data, 5×5 data, and 7×7 data.

9. A data processing method of an image sensor, comprising:
   determining whether dead pixels exist in homogeneous pixels, in a window of image data, having the same color characteristic as a center pixel in the window; and
   calculating a difference value between the center pixel and homogeneous pixels determined as normal pixels, and correcting a center pixel value by using the calculated difference value,
   wherein, in the determining of whether the dead pixels exist in the homogeneous pixels, the homogeneous pixels are determined as dead pixels when pixel values of the homogeneous pixels are lower than a predetermined low-threshold value or higher than a predetermined high-threshold value, wherein the low-threshold value and the high-threshold value are defined based on the center pixel value,
   wherein the low-threshold value and the high-threshold value are defined by multiplying the center pixel value by a reference value.

10. The data processing method of claim 9, further comprising determining whether the center pixel is a dead pixel.

11. The data processing method of claim 9, further comprising interpolating the corrected center pixel value.

12. The data processing method of claim 9, wherein the homogeneous pixels selected to determine whether the dead pixels exist have different channels with the center pixel.

13. The data processing method of claim 9, wherein, in the correcting of the center pixel value, the center pixel value is substituted by a mean value of the center pixel value and the homogeneous pixel value having a greatest difference value from the center pixel among the homogeneous pixels determined as the normal pixels.

14. The data processing method of claim 9, wherein the center pixel is a green pixel on the adjacent left and right sides of which blue pixels are located, or a green pixel on the adjacent left and right sides of which red pixels are located.

15. The data processing method of claim 9, wherein the image data comprises Bayer pattern.

16. The data processing method of claim 9, wherein the window comprises one of 3×3 data, 5×5 data, and 7×7 data.

* * * * *